US010161092B2

(12) United States Patent
Lovell

(10) Patent No.: US 10,161,092 B2
(45) Date of Patent: Dec. 25, 2018

(54) ROTATING AND / OR EXTENDING HAND-DRIVEN TOOL AND ASSOCIATED SYSTEMS AND METHODS

(71) Applicant: Chris Lovell, Clear Lake, IA (US)

(72) Inventor: Chris Lovell, Clear Lake, IA (US)

(*) Notice: Subject to any disclaimer, the term of this patent is extended or adjusted under 35 U.S.C. 154(b) by 0 days.

(21) Appl. No.: 15/584,900

(22) Filed: May 2, 2017

(65) Prior Publication Data

US 2017/0362789 A1    Dec. 21, 2017

Related U.S. Application Data

(60) Provisional application No. 62/330,572, filed on May 2, 2016.

(51) Int. Cl.

| | | |
|---|---|---|
| *E01H 5/02* | (2006.01) | |
| *B25G 1/10* | (2006.01) | |
| *F16B 7/10* | (2006.01) | |
| *B25G 1/04* | (2006.01) | |
| *F16B 7/04* | (2006.01) | |
| *F16B 7/18* | (2006.01) | |

(52) U.S. Cl.
CPC ............... *E01H 5/02* (2013.01); *B25G 1/04* (2013.01); *B25G 1/102* (2013.01); *F16B 7/042* (2013.01); *F16B 7/10* (2013.01); *F16B 7/182* (2013.01)

(58) Field of Classification Search
CPC .... E01H 5/02; B25G 1/04; B25G 1/06; A01B 1/022; A01B 1/22; F16B 7/10; F16B 7/1418
USPC ................................................ 294/54.5, 57
See application file for complete search history.

(56) References Cited

U.S. PATENT DOCUMENTS

| 187,222 | A | * | 2/1877 | Dowler | |
|---|---|---|---|---|---|
| 1,762,718 | A | * | 6/1930 | Hervey | B25G 3/02 294/57 |
| 2,047,485 | A | * | 7/1936 | McBrady | A01B 1/022 294/57 |
| 2,228,275 | A | * | 1/1941 | Lawrence | A01G 3/00 294/57 |
| 2,279,324 | A | * | 4/1942 | Julien | B25G 1/04 16/429 |
| 5,048,883 | A | * | 9/1991 | Waluk | E01H 5/02 294/54.5 |
| 5,799,996 | A | * | 9/1998 | Fredrickson | A01B 1/20 172/375 |
| 6,113,074 | A | * | 9/2000 | Foley | B25G 1/06 254/131.5 |
| 6,145,899 | A | * | 11/2000 | Kelemen | A01B 1/00 294/57 |
| D613,567 | S | * | 4/2010 | Atnip | D8/10 |
| 7,882,596 | B2 | * | 2/2011 | Hixon | A01B 1/026 16/406 |
| 8,166,677 | B1 | * | 5/2012 | Woyak | E01H 5/02 294/54.5 |

(Continued)

*Primary Examiner* — Dean J Kramer
(74) *Attorney, Agent, or Firm* — Davis, Brown, Koehn, Shors & Roberts, P.C.; Matthew Warner-Blankenship

(57) ABSTRACT

The disclosed apparatus, systems and methods relate to an improved extendable and rotatable shovel for use in various applications such as the shoveling of snow. Users can modify the shovel to accommodate their stature and personal preferences. The shovel is selectively rotatable and extendable, so as to be capable of a range of acute driving positions, such that a user can position the handle on or at the shoulder of the user in an upright driving position.

11 Claims, 14 Drawing Sheets

(56) References Cited

U.S. PATENT DOCUMENTS

| | | | |
|---|---|---|---|
| 8,177,272 B2* | 5/2012 | Schinella, Jr. | E01H 5/02 294/53.5 |
| 8,220,852 B2* | 7/2012 | Fenstemaker | B25F 1/02 294/51 |
| 9,717,174 B2* | 8/2017 | Chou | A01D 7/00 |
| 2008/0016653 A1* | 1/2008 | Baradzi | B25G 1/102 16/430 |

* cited by examiner

ROTATING AND / OR EXTENDING HAND-DRIVEN TOOL AND ASSOCIATED SYSTEMS AND METHODS

CROSS-REFERENCE TO RELATED APPLICATIONS

This application claims priority to U.S. Provisional Application No. 62/330,572 filed May 2, 2016 and entitled "Shovel with Extendable Handle and Rotating Grip," which is hereby incorporated by reference in its entirety under 35 U.S.C. § 119(e).

TECHNICAL FIELD

The disclosed technology relates generally to an improved hand tool, and in particular, to the devices, methods, and design principles allowing the user to rotate the handle of a tool such as a shovel. In additional implementations, the disclosure also relates to the devices, systems and methods allowing for the extension of the tool for use at leveraged angle.

BACKGROUND

The disclosure relates to apparatus, systems and methods for improved shoveling.

In certain climates, snow removal from driveways, sidewalks and parking lots is necessary for safety reasons, and also necessary to provide access to businesses and residences. In snowy climates, snow removal is often mandated by city ordinance.

There are several drawbacks to conventional snow shovels. For instance, conventional snow shovels are powered by the user's back and arm strength, as well as the stamina of the user. In addition, the orientation of the conventional shovel handle or grip is problematic, particularly when the user is pushing heavy snow, placing strain on the user's wrist and shoulder. The rotation required to then remove the snow from the blade can be awkward and poses additional risk of injury.

Snow shovels are generally understood in the art, and are fairly standard. Typically, a snow shovel has a handle attached to a shaft which is attached to a blade which is capable of removing snow. Snow shovels are typically sold in a standard size, regardless to height of the user. Generally, the user uses the blade to push or scoop the snow, and then removes the snow through the rotation of the snow shovel. The user's back is typically rounded and unsupported, #2866736 shoulder internally rotated and wrist externally rotated, all of which are widely known to be unsafe positions from which to produce force. This repetitive motion conducted from unsupported and non-neutral body positions can lead to soreness, strained muscles, and more serious conditions. Although necessary, snow removal is burdensome, and poses serious risk of injury. Thus, there is a need for a better, safer, and more efficient method of removing snow.

The present invention relates generally to an improved snow shovel and in particular, to the devices, methods, and design principles of an extendable and rotatable shovel for use in various applications such as the shoveling of snow.

BRIEF SUMMARY

Discussed herein are various devices, systems and methods relating to an improved shovel.

The disclosed embodiments overcome the disadvantages of traditional methods of shoveling snow, trash, and other debris. One aspect of certain disclosed embodiments is an extendable or adjustable handle that for the first time allows the shovel to be powered by the weight of the user. In at least one embodiment, the shovel can be extended or adjusted to accommodate the height of the user. In an alternative embodiment, the handle is configured to comfortably receive the user's shoulder and/or armpit. In another aspect, the grip can be rotated 45 degrees to allow for more comfortable and efficient pushing. This adjustment places the powering arm in a neutral position, and provides a more comfortable and safer position from which to push the snow. In addition, the ability to rotate the grip provides a more comfortable and efficient rotation when removing snow from the shovel blade.

As described herein, individuals in snowy climates can for the first time benefit from a shovel that allows them to stand up taller, place the grip on their shoulder, and use their weight to move snow. With multiple distinct handle positions, as well as various grip positions, the present invention confers versatility to the snow shoveling experience. Users can modify the shovel to accommodate their stature and personal preferences, resulting in a better, safer, and more efficient shoveling experience. In addition to increasing ease and efficiency of snow removal, the present invention will decrease the risk of injury associated with snow removal.

One general aspect includes a handheld tool, including: an elongate shaft having proximal and distal ends; an implement disposed at the distal end and having a tool axis; and a handle disposed at the proximal end, where the handle is capable of selective rotation relative to the tool axis.

Implementations may include one or more of the following features. The tool where the handle can be selectively extended. The tool where the elongate shaft includes telescoping tubular portions. The tool where the tool is a shovel. The tool where the handle further includes ergonomic ends configured to cradle the shoulder of a user. The tool further including a locking collar. The tool further including a coupling member. The tool where the coupling member and locking collar are in rotational communication. The push tool where the elongate shaft is configured to be selectively extended. The push tool including a rotating collar in locking communication with the handle. The push tool where the rotating collar includes internal threads. The push tool where the rotating collar is configured to be in linear communication with the elongate shaft via rotation of the rotating collar. The push tool where the rotating collar is configured to secure the handle in a fixed rotational position. The push tool where the handle is a d-handle. The handle where the rotating collar is configured to be in linear communication with the elongate shaft via rotation of the rotating collar. The handle where the rotating collar is configured to secure the handle in a fixed rotational position. The handle where the handle is a d-handle. The handle where the rotating collar and coupling portion are in rotational communication via threads.

One general aspect includes a push tool, including an elongate shaft having proximal and distal ends; a handle disposed at the proximal shaft end and adapted to cradle the shoulder of a user; and an implement disposed at the distal shaft end, where the handle can be selectively rotated relative to the implement.

Implementations may include one or more of the following features. The push tool where the elongate shaft is configured to be selectively extended. The push tool including a rotating collar in locking communication with the handle. The push tool where the rotating collar includes internal threads. The push tool where the rotating collar is configured to be in linear communication with the elongate shaft via rotation of the rotating collar. The push tool where the rotating collar is configured to secure the handle in a fixed rotational position. The push tool where the handle is a D-handle. The handle where the rotating collar is configured to be in linear communication with the elongate shaft via rotation of the rotating collar. The handle where the rotating collar is configured to secure the handle in a fixed rotational position. The handle where the handle is a D-handle. The handle where the rotating collar and coupling portion are in rotational communication via threads.

One general aspect includes a handle for use with a push tool, including a rotating collar and a coupling portion adapted to be attached to an elongate shaft.

Implementations may include one or more of the following features. The handle where the rotating collar is configured to be in linear communication with the elongate shaft via rotation of the rotating collar. The handle where the rotating collar is configured to secure the handle in a fixed rotational position. The handle where the handle is a D-handle. The handle where the rotating collar and coupling portion are in rotational communication via threads.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

Discussed herein are various devices, systems and methods relating to an improved extending and/or rotating shovel. For brevity, and for ease of explanation, these embodiments may be described in relation to a "shovel," though that is not intended to limit the scope of the disclosure in any way. For example, certain aspects can be used in other applications, such as for brooms, mops, or other long-handled tools, as would be readily understood in the art.

According to certain embodiments, the tool or shovel has a selectively rotating handle. In certain additional implementations, the tool or shovel also has an extending shaft to allow the user the option to reposition the shovel in a variety of ways for driven use, such as in the process of shoveling snow. For example, in certain embodiments, after placing the scoop or blade on the ground, the user is able to extend the shovel shaft, rotate the handle, and drive the shovel with a shoulder. It is understood that these implementations improve the user's leverage and comfort in various applications, such as in snow shoveling. Alternatively, in certain embodiments, the shaft is of fixed length or the handle does not rotate, as would be understood by a skilled artisan.

Figures 1A, 1B:
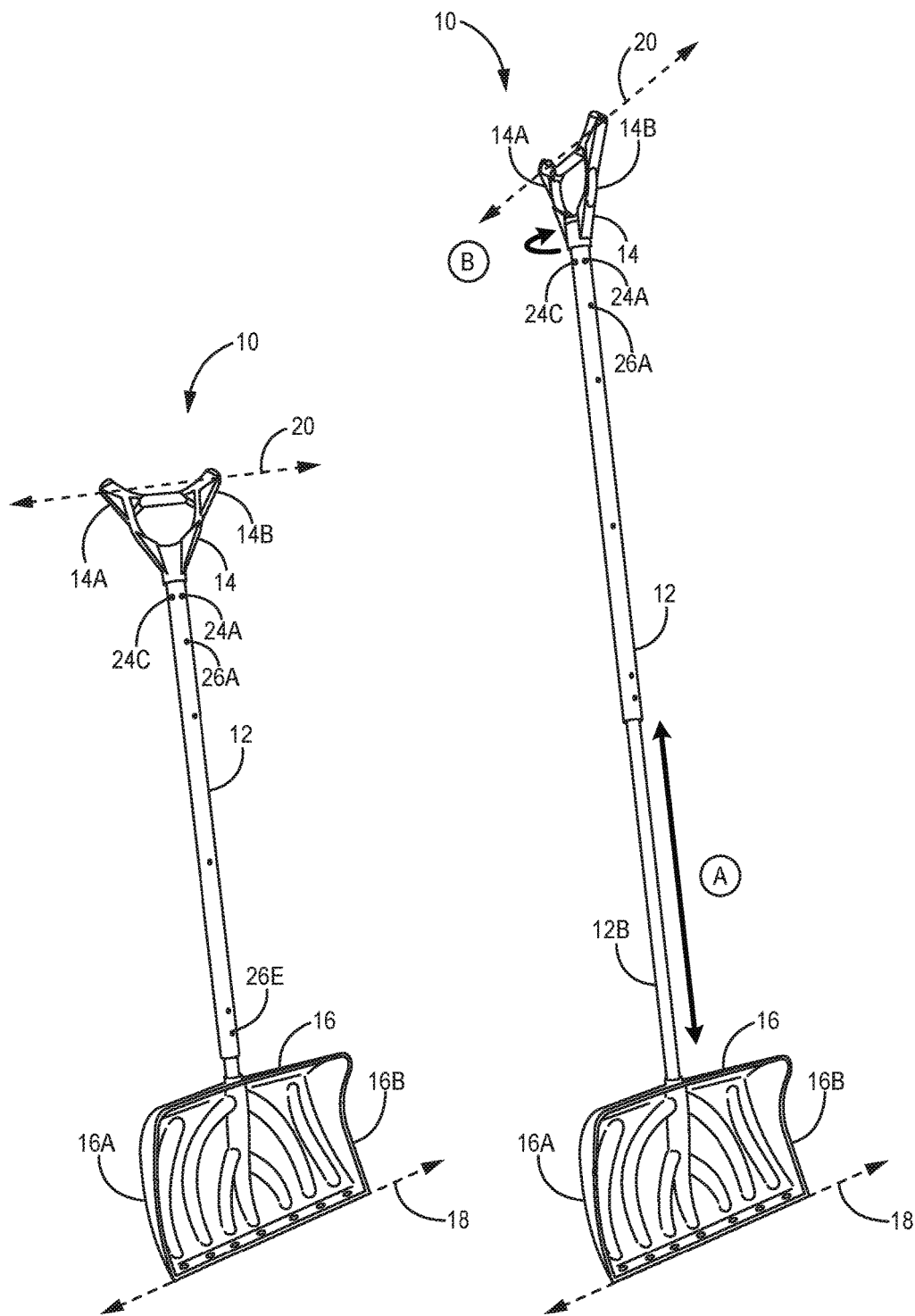
FIG. 1A shows the device in a fully collapsed position, according to an exemplary embodiment.
FIG. 1B shows the device in a fully extended position, according to an exemplary embodiment.
Figures 1C, 1D:
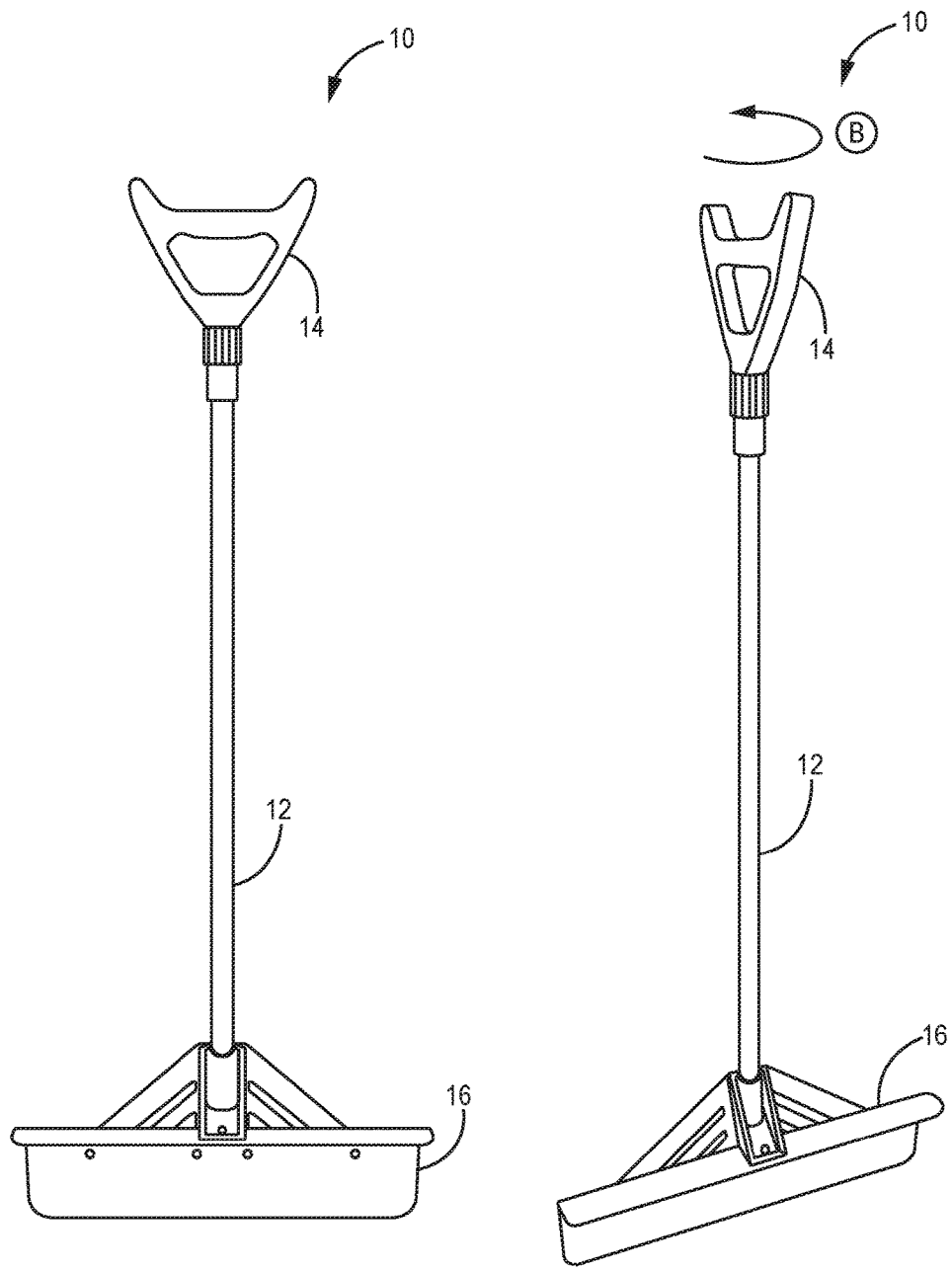
FIG. 1C shows the device having the handle in a parallel position, according to another embodiment.
FIG. 1D shows the device having the handle in a perpendicular position, according to another exemplary embodiment.

Turning to the drawings in greater detail, FIGS. 1A-1B depict one implementation of the tool 10 configured to both extend (reference arrow A) and be capable of handle rotation (reference arrow B). While reference is made to either implementation as applied to a shovel are found throughout the present disclosure, it is understood that these discussions are in no way intended to be limiting to any specific modality, and that the design principles discussed are applicable to all other relevant implementations of the tool having a rotating handle.

In the implementations of FIGS. 1A-1D, the tool 10 is a shovel 10, and has a generally tubular elongate shaft 12, a graspable handle 14 capable of selective rotation and a distal implement 16—in this implementation a shovel blade or scoop 16—which is configured to collect and move material, such as snow. It is understood that in alternate implementations, other implements such as or other kinds of tool implements having a t-shaped or other rotationally-relevant shape, several non-limiting examples being shovels and rakes and implements of destruction, including push brooms, forks, rakes, squeegees, scrapers, hoes, spades, tampers, cultivators and the like, as would be readily understood by the skilled artisan.

As is also shown in the implementation of FIG. 1A, the scoop 16 has first 16A and second 16B sides defining a tool axis 18, and the handle 14 also has first 14A and second 14B sides that define a handle axis 20. It is understood that in the implementation FIG. 1A the shovel 10 is in a shoveling position, such that the tool axis 18 and handle axis 20 are substantially parallel.

As shown in the implementation of FIGS. 1A-1B, the shaft 12 can be extended (as shown at reference arrow A). Further, in this implementation as well as the implementations of FIGS. 1C-1D, the handle 14 can be rotated (as shown by reference arrow B), such that the handle axis 20 has been rotated and is substantially perpendicular to the scoop access. It is understood that in the implementation of FIGS. 1B and 1D, the shovel 10 is in the driving position.

Figure 2A:
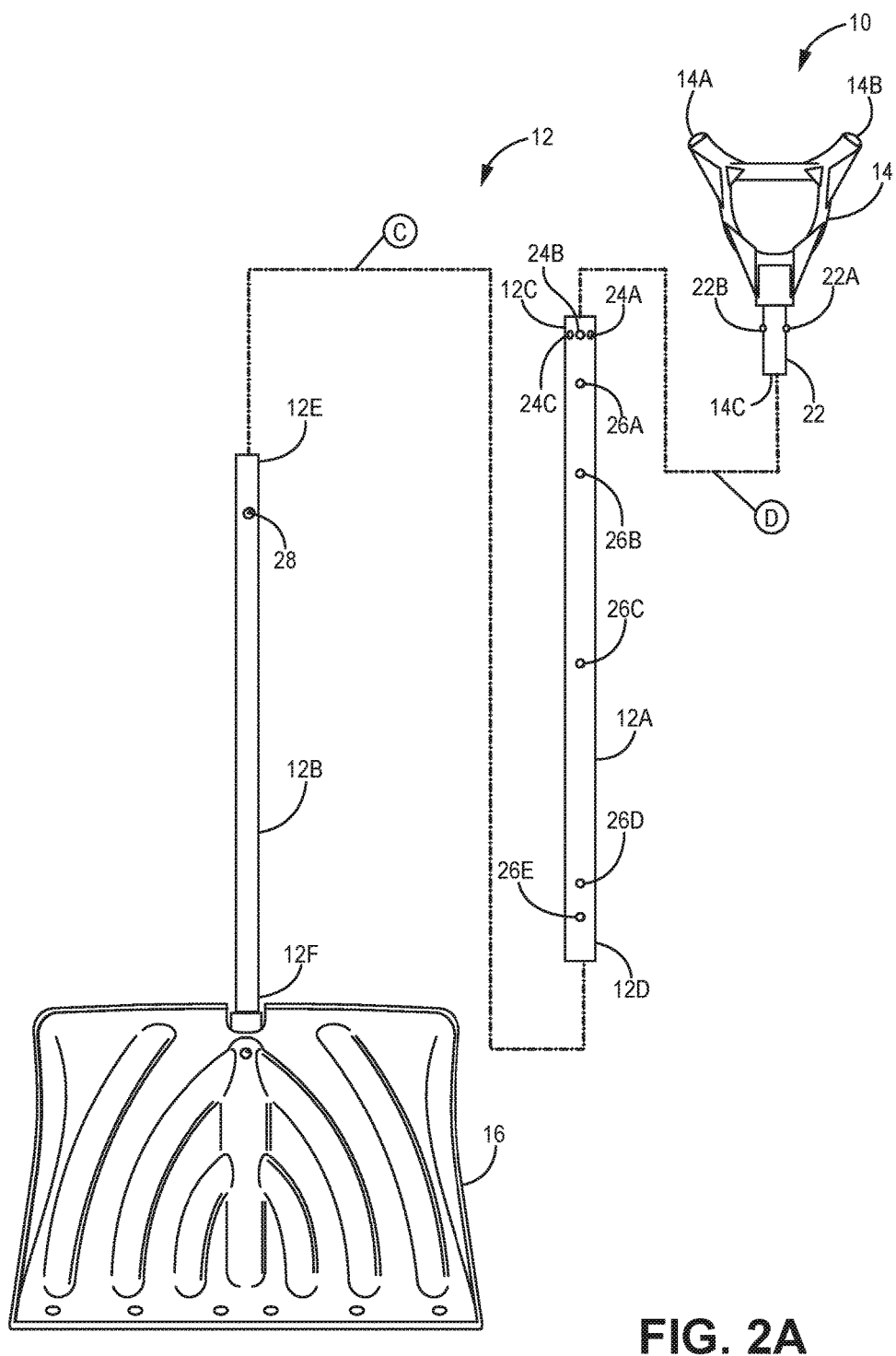
FIG. 2A shows the device collapsed, according to the same exemplary embodiment.

Turning to the shovel 10 implementation of FIG. 2A, the elongate shaft 12 has a first tubular portion 12A and second tubular portion 12B which are assembled (shown by reference line C) to be in telescoping and rotating communication relative to one another, as is shown in the implementation of FIG. 1B.

In this implementation, the handle 14 is configured to be capable of rotation relative to the shaft 12. In certain implementations, the handle has a tubular insertion shaft 22 (also referred to herein in relation to the distal handle portion 14C), at least one handle projection 22A, 22B radially disposed on the shaft 22. In the implementation of FIG. 2A, these mounting projections 22A, 22B can be spring button clips or detents, as is further shown in relation to FIG. 2C.

Continuing with FIG. 2A, the first tubular shaft portion 12A is substantially hollow so as to accommodate the handle shaft 22, further comprises at least one handle opening 24A, 24B, 24C disposed radially at the proximal first shaft portion end 12C to accept the handle projections 22A, 22B. It is understood that in exemplary embodiments of the shovel with a rotating handle 14, more handle openings 24 are provided than there are handle projections 22A, 22B.

For example, in an implementation wherein there are two handle projections 22A, 22B disposed 180 degrees from one another, four handle openings 24A, 24B, 24C, 24D disposed 90 degrees apart are required to allow the handle to be selectively secured in the shoveling position and driving position (as shown in relation to FIGS. 1A-1B). In further implementations, the handle openings 24A, 24B, 24C, 24D can be disposed such that other handle axis orientations are possible, such as about 45 degrees and/or about 135 degrees from the axis 18 shown in FIG. 1A. It is understood that in alternate embodiments, additional projection and opening configurations are possible, and that other methods of selectively securing the handle 14 in several rotated positions relative to the shaft 12 are contemplated such that the shaft 12 can be extended incrementally.

In the implementation of FIG. 2A, the first shaft portion 12 defines several telescoping openings 26A, 26B, 26C, 26D, 26E distributed from the proximal first shaft portion end 12C to the distal first shaft portion end 12D. It is understood that these telescoping openings 26 are adapted to receive a detent scoop projection 28, so that the user can extend and secure the shaft at various lengths. For example, in the implementation of FIG. 1A, the scoop projection 28 is in selectively secured communication with the most proximal telescoping opening 26A, while in the implementation of FIG. 1B the second tubular shaft portion has been urged distally so that the scoop projection 28 is in selectively secured communication with the most distal telescoping opening 26E. Other configurations are possible.

Figure 2B:
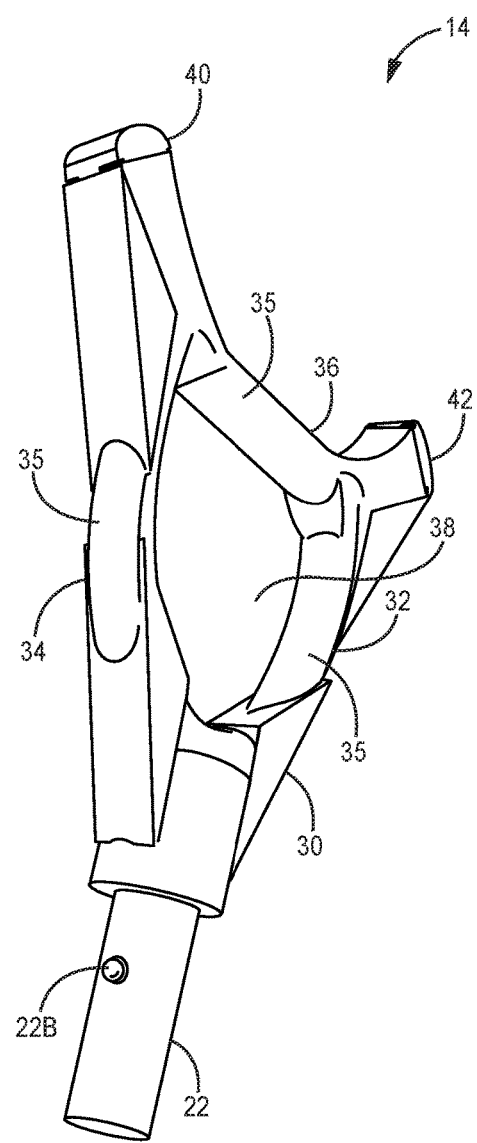
FIG. 2B shows a detailed perspective view of a handle, according to an exemplary embodiment.
Figure 7B:
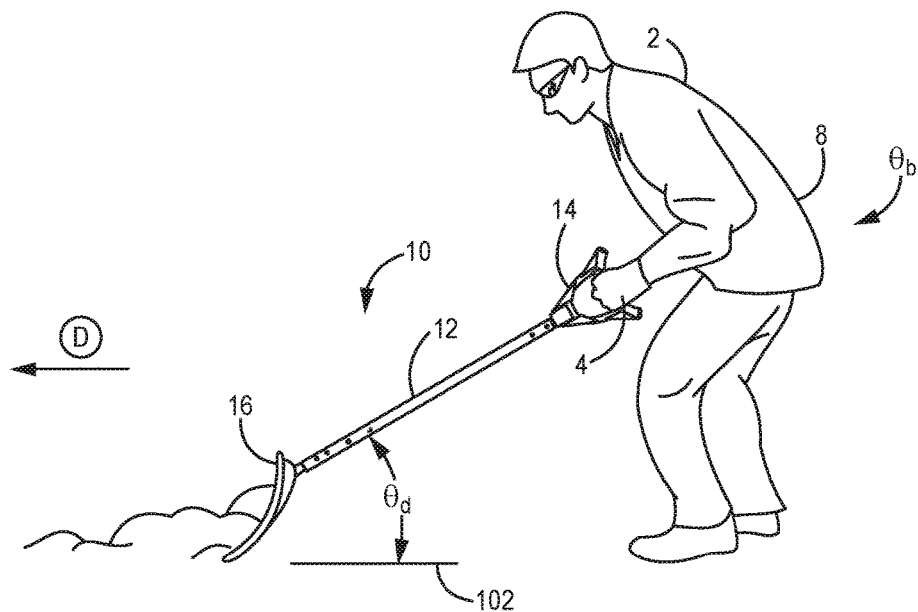
FIG. 7B shows the exemplary device of FIG. 7A in use.
Figure 8A:
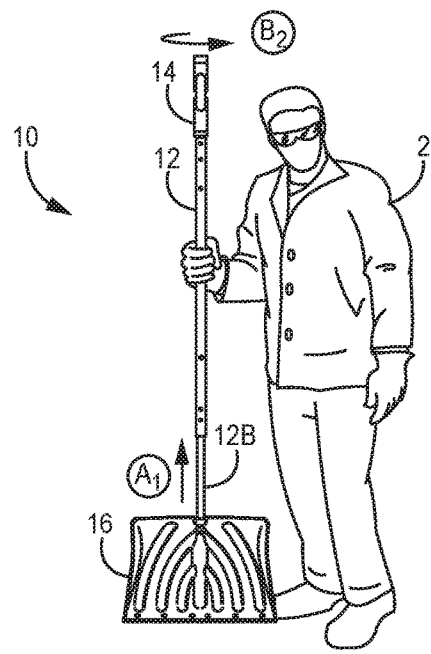
FIG. 8A shows another example of the exemplary device, in which the shaft is extended mid-way and the handle is rotated.
Figure 8B:
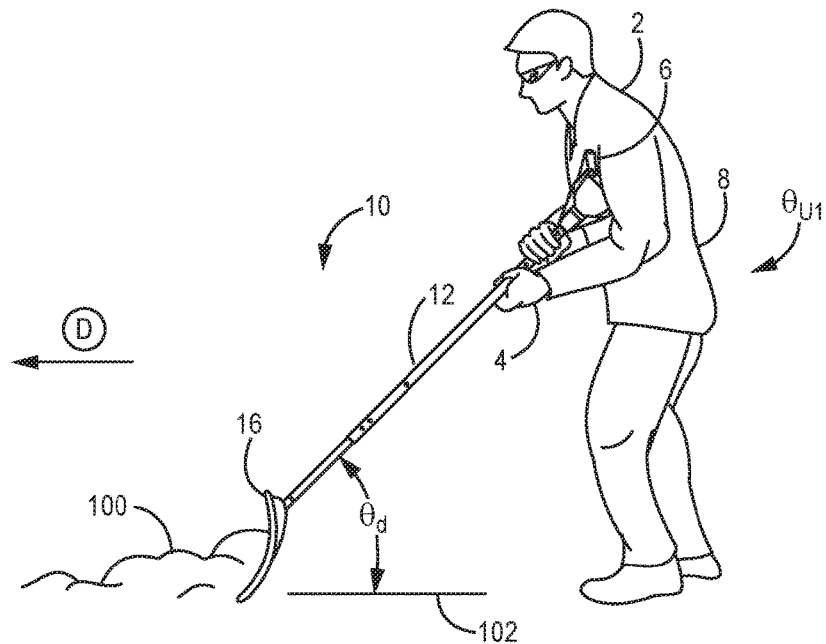
FIG. 8B shows the exemplary device of FIG. 8A in use.
Figure 9A:
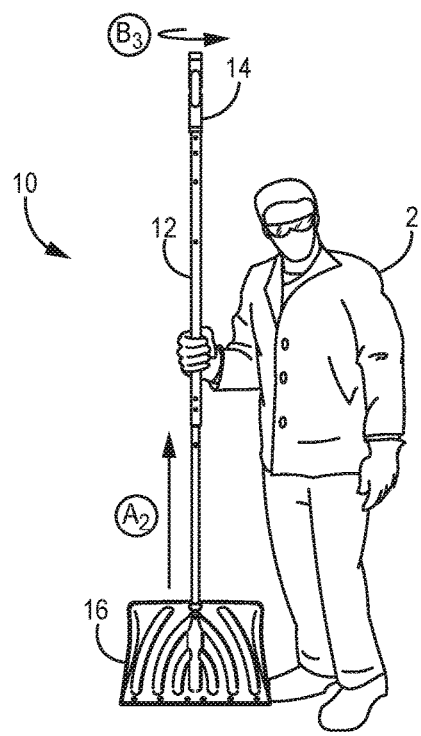
FIG. 9A shows another example of the exemplary device, in which the shafted is fully extended and the handle is rotated.
Figure 9B:
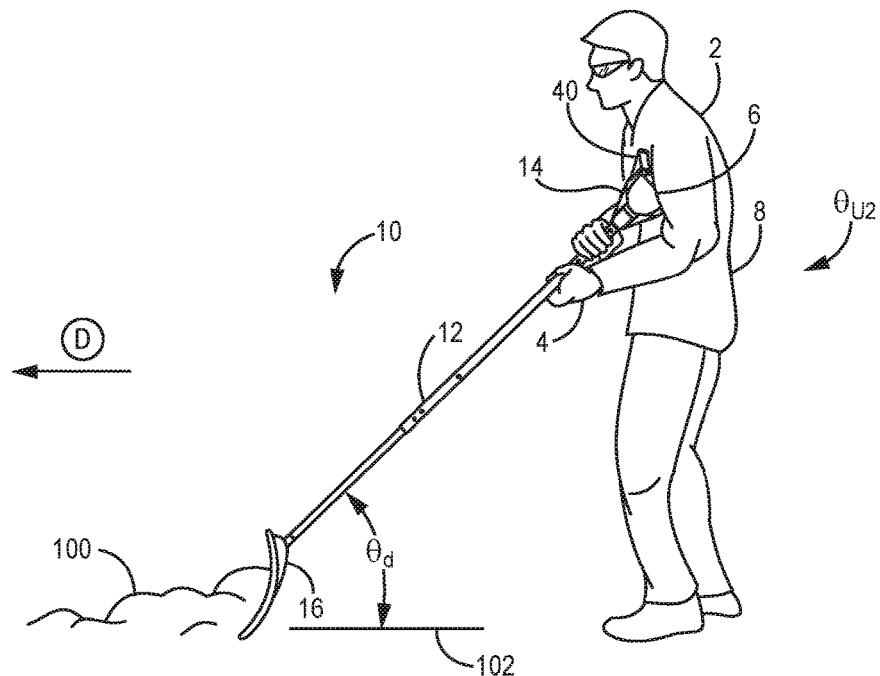
FIG. 9B shows the exemplary device of FIG. 9A in use.

As best shown in the implementation of FIG. 2B, the handle 14 can be a "D-Plus" grip 30 configured to be cradled in the shoulder of the user, as is shown in FIGS. 8B and 9B. In the implementation of FIG. 2B, the D-Plus grip 30 has side members 32, 34 and an end member 36. In the implementation of FIG. 2B, the side members 32, 34 and end member 36 are disposed triangularly and enclose a handle opening 38, such that the side members are disposed adjacent to the handle shaft 22 and the end member 36 is disposed opposite the handle shaft 22, though other configurations are of course possible. In this implementation, the side members 32, 34 and end member 36 each have a grasping region 35 adapted to be easily grasped by the hand 4 of the user 2, as best shown in FIGS. 6B and 7B. It is understood that in alternate embodiments, various grip enhancements and pads can be provided on the grasping regions.

In this implementation, the end member 36 has ergonomic ends 40, 42 that are adapted to be nested and fit comfortably in the armpit/shoulder 6 of the user 2 when the shovel 10 is in the driving position, as is best shown in relation to FIGS. 8B and 9B. It is understood that in alternate embodiments the ergonomic ends 40, 42 can take on a variety of shapes and configurations to best fit within the armpit/shoulder 6, and can further comprise additional support and comfort components, such as pads.

Figure 2C:
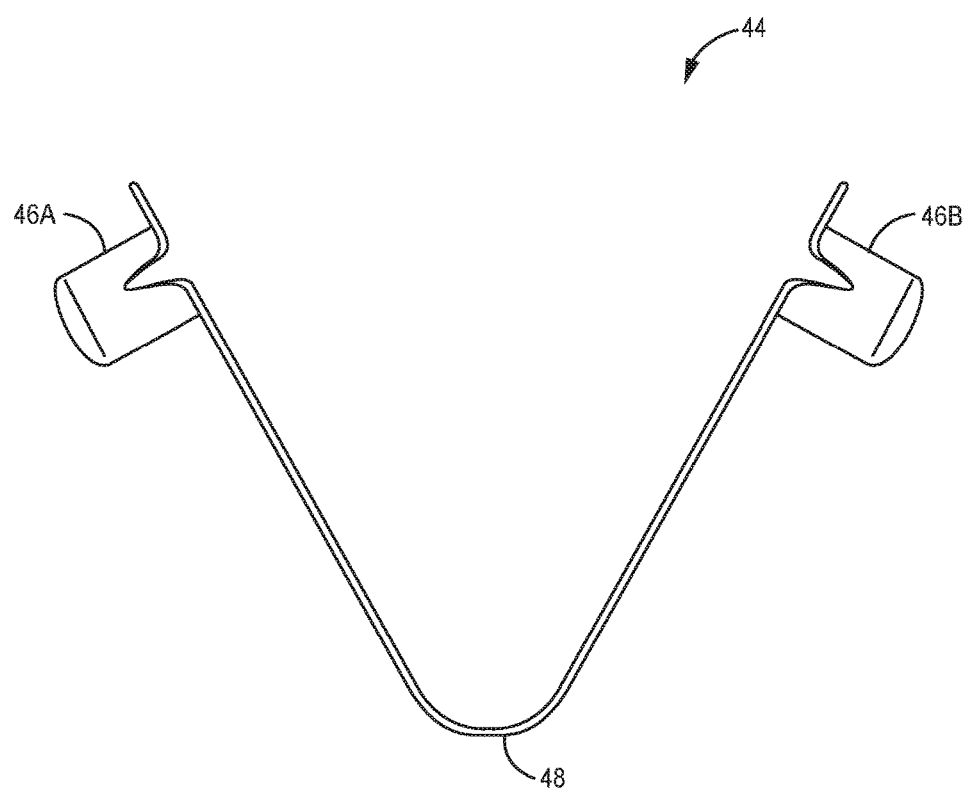
FIG. 2C shows a detailed front view of a fastening mechanism.

In FIG. 2C, an implementation of a spring or detent 44 is shown. In this implementation, the detent 44 has first 46A and second 46B projections and a spring joint 48 which urges the projections 46A, 46B into the depicted position. Accordingly, the detent 44 can be disposed within the handle shaft such that the projections 46A, 46B can be inserted through openings (not shown) and used as the handle projections 22A, 22B of FIG. 2, or within the elongate shaft 12 as the scoop projection 28—in this configuration a second scoop projection (not shown) is disposed on the opposite side of the second shaft portion 12B.

FIGS. 3A-5F depict further implementations of the shovel 10 utilizing a collar 50. In these implementations, the collar 50 is a locking collar 50 that allows the user to selectively rotate the handle 14 freely or lock it into a specific position relative to the shaft 12, similar to the embodiments featuring a detent 44 above. In certain implementations featuring a collar 50, however, the handle 14 can be locked in any—or virtually any—rotated angle relative to the shaft 12, as would be understood.

As shown in the implementations of FIGS. 3A-D, the collar 50 is an elongate collar having a central lumen 50A, and is fitted around the exterior of the distal handle portion 14C. A coupling member 52 can also be disposed at the proximal end 12A of the shaft 12. The distal handle portion 14A is disposed within a coupling lumen 52A within the coupling member 52, the coupling member being disclosed within the collar 50. Further, in certain implementations, the collar 50 has internal threads 51 configured to be in rotational communication with external threads 53 of the coupling member 52 as would be understood by the skilled artisan. In these implementations, therefore, the collar 50 can be rotated relative to the coupling member 52 to "tighten"/"lock" and/or "loosen" or "unlock" the rotation of the handle 14 as described herein.

Figure 3A:
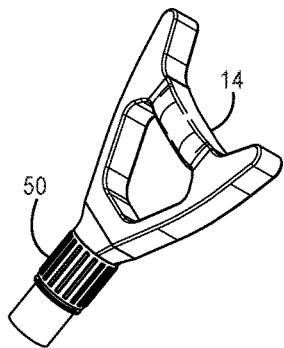
FIG. 3A shows a detailed perspective view of a handle, according to another exemplary embodiment.
Figure 3B:
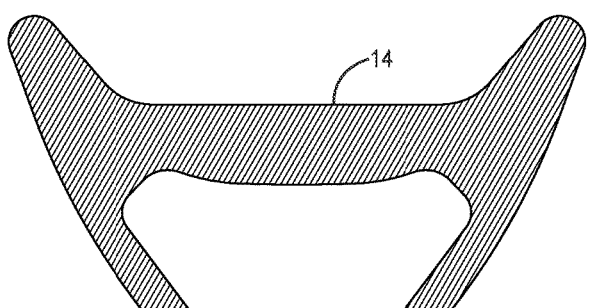
FIG. 3B shows a cross-sectional view of a handle, collar and coupling portion, according to an exemplary embodiment.
Figure 3C:
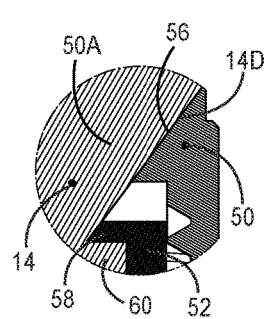
FIG. 3C shows a detailed view of the junction between the collar and handle, according to the embodiment of FIG. 3B.
Figure 3D:
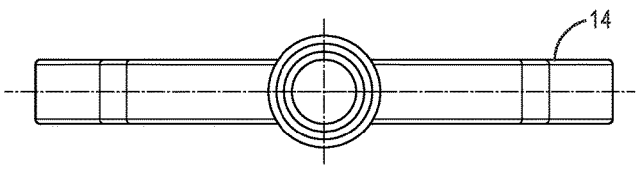
FIG. 3D shows a bottom view of the handle of FIG. 3A.
Figure 3H:
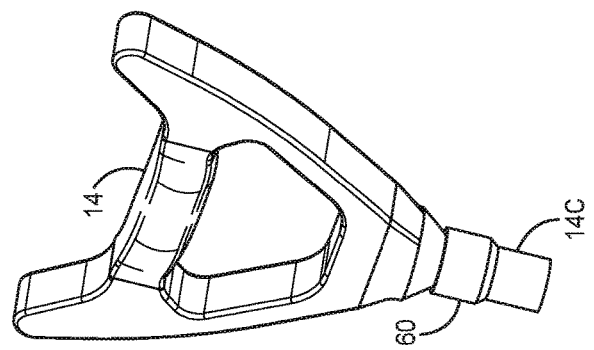
FIG. 3H shows a perspective view of the handle of FIG. 3E.
Figure 3G:
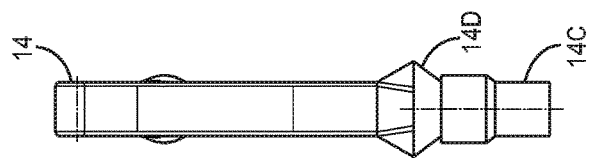
FIG. 3G shows an external side view of the handle of FIG. 3E.
Figure 3F:
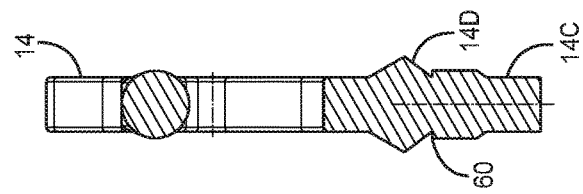
FIG. 3F shows a side cross-sectional view of the handle of FIG. 3E.
Figure 3E:
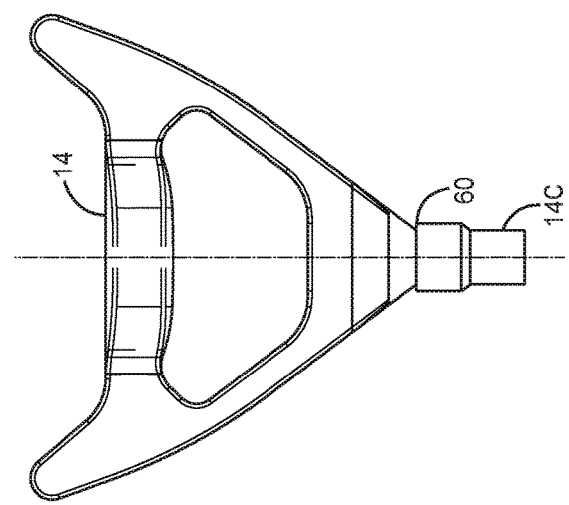
FIG. 3E shows a front view of a handle, according to another exemplary embodiment.
Figure 4A:
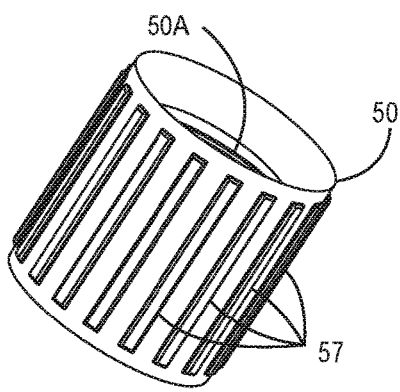
FIG. 4A shows a perspective view of a rotating collar, according to one embodiment.
Figure 4B:
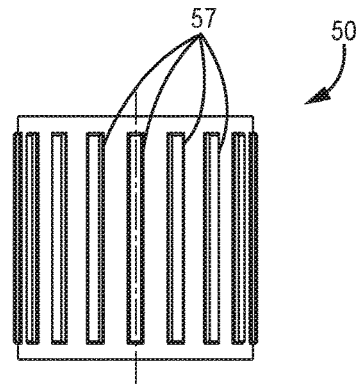
FIG. 4B shows a side view of the collar of FIG. 4A.
Figure 4C:
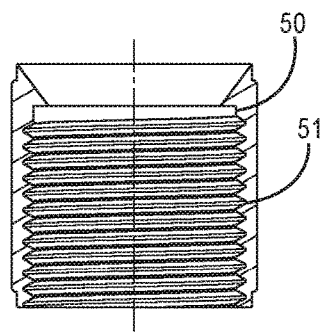
FIG. 4C is a cross-sectional side view of the collar of FIG. 4A.
Figure 4D:
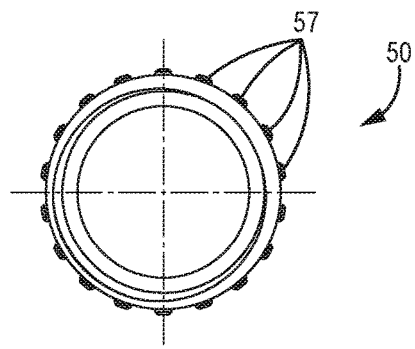
FIG. 4D is a top view of the collar of FIG. 4A.

As shown in the implementations of FIGS. 3B and 3C, the rotation of the collar 50 relative to the coupling portion 52 causes the collar 50 to move proximally toward the "locked" position (shown by reference arrow L) or distally toward the unlocked position (shown by reference arrow U). In various implementations, a lock stop, or flange 55 can be disposed radially around the exterior of the coupling portion 52 to prevent the collar 50 from being rotated and therefore moved distally (reference arrow U) beyond a certain threshold, as would be understood by the skilled artisan. Alternate implementations may use other components to limit the overall collar throw, as would be understood.

Continuing with FIGS. 3B and 3C, as well as in FIGS. 4A-4D, in certain implementations, the collar 50 is able to "lock" the rotation of the handle 14 by applying physical pressure or friction to the handle 14 from the "locked" position. In certain of these implementations, and as shown in detail in FIG. 3C, the collar 50 has a locking face 56 disposed within the central lumen 50A of the collar 50. In these implementations, the movement of the collar 50 proximally (as shown by reference arrow L) causes the locking face 56 to abut against the handle 14 at an outward plane 14D, thereby preventing its rotation. It is understood that the locking face 56 and outward plane 14D of various implementations are disposed at complimentary angles. Further views of the handle 14 are shown in FIGS. 3E-3H.

Figure 5A:
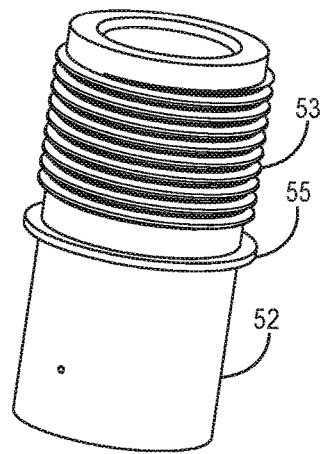
FIG. 5A is a perspective view of the coupling portion, according to one embodiment.
Figure 5B:
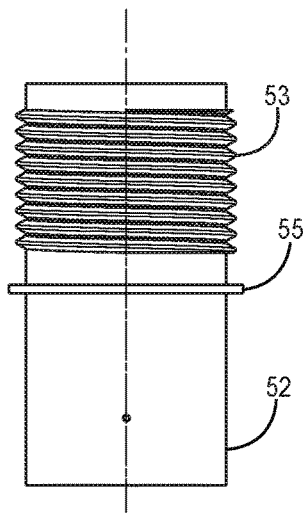
FIG. 5B is a side view of the coupling portion of FIG. 5A.
Figure 5C:
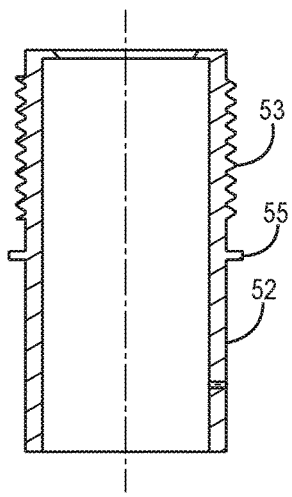
FIG. 5C is a side cross-sectional view of the coupling portion of FIG. 5A.
Figure 5D:
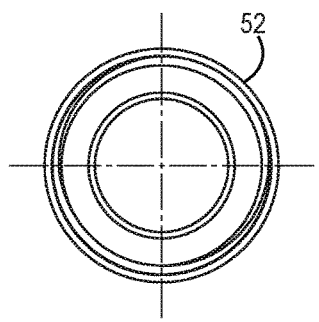
FIG. 5D is a top view of the coupling portion of FIG. 5A.
Figures 5E, 5F:
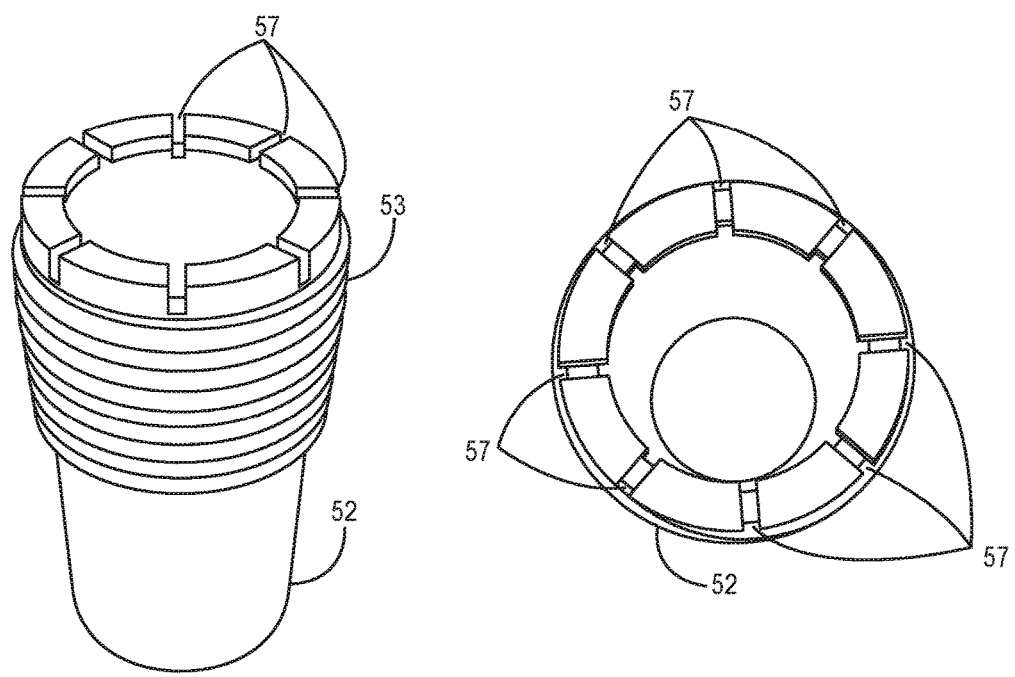
FIG. 5E shows a perspective view of the coupling portion, in which the coupling member comprises radial proximal openings, according to one embodiment.
FIG. 5F is a top view of the coupling portion of FIG. 5E.

In the implementations of FIGS. 3B and 3C, as well as FIGS. 5A-5F, the coupling member 52 has an inward projection 58 that further abuts against a handle flange 60. As would be understood, in these implementations, the collar 50 can therefore be used to apply proximal force against the handle 14 via the locking face 56. Simultaneously, in response to the urging of the collar proximally (reference arrow L) relative to the coupling portion 52, the inward projection 58 provides a corresponding distal force against the handle flange 60, thereby applying opposite forces against the handle in two areas and locking the handle 14 in place. One of skill in the art would appreciate that various alternate implementations are possible. As shown in the implementation of FIGS. 5E-F, in certain implementations the coupling member 52 comprises radial proximal openings 57 to allow for ease of handle (not shown) insertion.

Figure 6A:
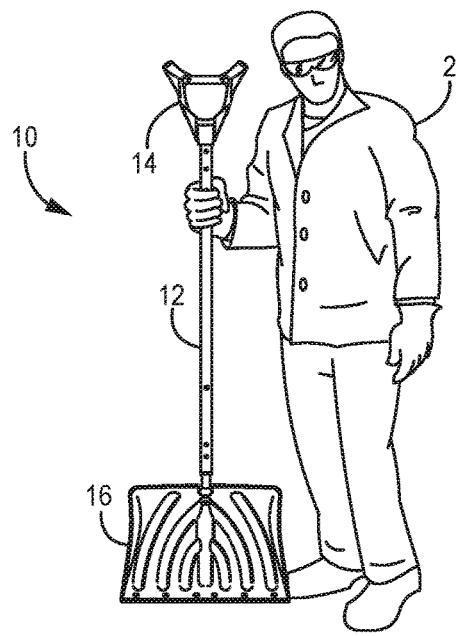
FIG. 6A shows one example of the exemplary device, in which the handle is in the co-axial position for use in a traditional manner.
Figure 6B:
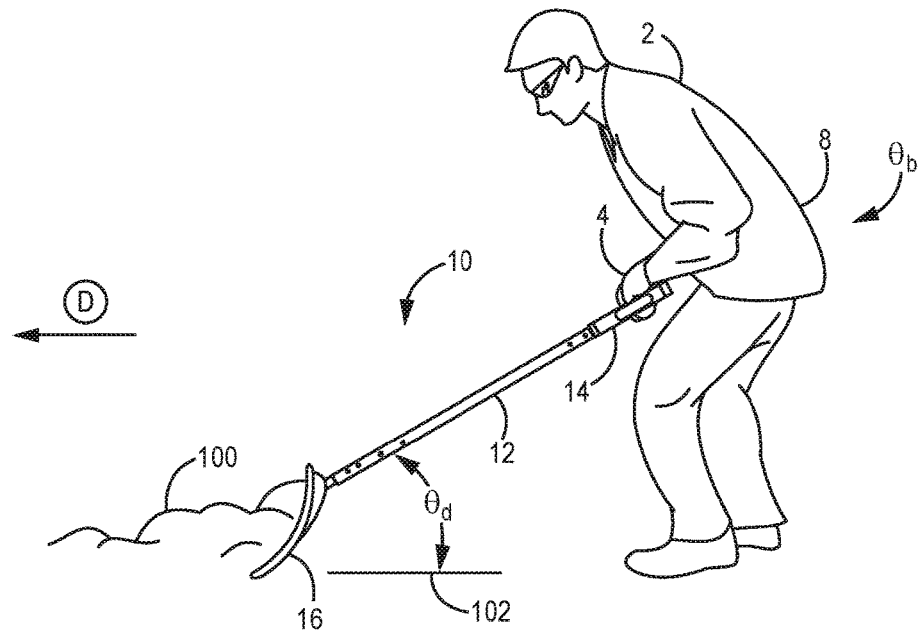
FIG. 6B shows the exemplary device of FIG. 6A in use.
Figure 7A:
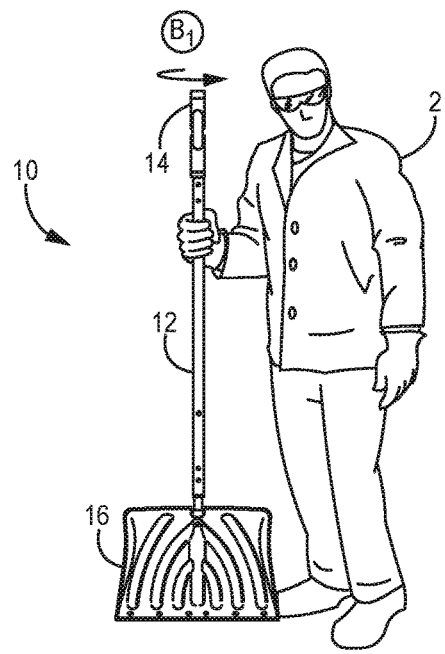
FIG. 7A shows another example of the exemplary device, in which the handle is rotated and the device is fully collapsed.

Several aspects of the various configurations and uses of the shovel 10 according to the disclosed implementations are shown in the implementations of FIGS. 6A-9B. In the implementations of FIGS. 6A-6B, the shovel 10 is in the shovel position, as generally described in relation to FIG. 1A. In this position, the user 2 is able to use the handle in the co-axial position to shovel material 100, such as snow, with the scoop 16 in the manner known to the skilled artisan or typical homeowner. As is also known, when in use pushing a material 100 such as snow along the ground (as shown generally in FIGS. 6B, 7B, 8B and 9B at reference arrow D), the blade or scoop 16 is preferentially disposed within a range of acute driving angles (designated generally at $\theta_d$) from the ground 102.

In the implementations of FIGS. 7A-7B, the user 2 has rotated the handle 14 into the driving position (shown by reference arrow $B_1$). In FIG. 7B, the user is again able to use the shovel 10 to shovel and push material or snow 100 along the ground, however the handle 14 is in a more ergonomic position for use in the hands 4 and/or shoulder of the user 2. As is also shown in the implementations of FIGS. 6A-7B, in these implementations, the maintenance of an ideal driving angle $\theta_d$ frequently results in the user 2 assuming a "crouched" or "hunched" back 8 position, as shown generally at $\theta_b$, which can cause discomfort or injury.

In the implementations of FIGS. 8A and 9A, the shaft 12 has been extended into two different driving positions (as shown by reference arrows $A_1$ and $A_2$), and the handles 14 rotated to about 90 degrees (as shown by reference arrows $B_2$ and $B_3$), such that in these implementations the shovel 10 is in an extended driving position. As is shown in FIGS. 8B and 9B, in these extended driving positions, the user 2 is able to place the handle 14 into their armpit/shoulder 6 for ease of driving material 100 with the scoop 16 (as shown at reference arrow D).

Further, in the implementations of FIGS. 8A-9B, the user 2 is able to maintain an ideal driving angle $\theta_d$ range with respect to the ground 102. Additionally, in these implementations, the user 2 is able to adopt a more upright posture, as shown in FIGS. 8B and 9B at $\theta_{U1}$ and $\theta_{U2}$, respectively. It is therefore understood that in these implementations the user 2 is able to push the snow or other material 100 in greater comfort without compromising any leverage. In fact, in these implementations, the use of the shoulder/armpit 6 can allow for greater driving force with less strain on the user 2. In alternate embodiments, a variety of other configurations are contemplated, wherein the user 2 is able to quickly alternate between various shovel positions as dictated by the circumstances, such as alternating between shoveling and pushing, or driving snow on differing parts of the ground, sidewalk, driveway and the like.

Although the disclosure has been described with reference to preferred embodiments, persons skilled in the art will recognize that changes may be made in form and detail without departing from the spirit and scope of the disclosed apparatus, systems and methods.

What is claimed is:

1. A drivable, ergonomic handheld shovel, comprising:
   a. a telescoping elongate shaft comprising:
      i. a proximal tubular portion having a proximal end;
      ii. a distal tubular portion having a distal end; and
      iii. a plurality of openings defined in the telescoping elongate shaft that are constructed and arranged to accept detents to secure the elongate shaft in a plurality of positions;
   b. a shovel disposed at the distal end and defining a tool axis; and
   c. a D-plus grip disposed at the proximal end and defining a handle axis, the D-plus grip comprising first and second side members and an end member disposed triangularly and angled ergonomic ends configured to cradle the shoulder of a user,
   wherein:
   a. the telescoping elongate shaft is constructed and arranged for:
      i. selective, locking rotation relative to the handle axis, and
      ii. selective, locking extension, such that the handle axis and tool axis can be selectively locked into parallel and perpendicular orientations, at a range of acute driving angles from the ground such that the D-plus grip is positionable adjacent to the shoulder of an upright user while maintaining an acute driving angle.

2. The tool of claim 1, wherein the D-plus grip side members and end member define a handle opening.

3. An extendable, rotatable ergonomic shovel, comprising:
   a. an elongate, telescoping shaft having proximal and distal ends;
   b. a rotatable D-plus grip comprising first and second side members and an end member disposed triangularly, the end member comprising first and second angled ergonomic ends adapted to cradle the shoulder of a user;
   c. a rotating collar in locking communication with the grip; and
   d. a shovel disposed at the distal shaft end,
   wherein:
   i. the grip can be selectively rotated and the elongate shaft can be extended to a range of acute driving angles relative to the shovel, and
   ii. the first and second ergonomic ends are shaped and arranged to be positionable in an armpit of an upright user.

4. The shovel of claim 3, wherein the rotating collar comprises internal threads.

5. The shovel of claim 3, wherein the rotating collar is configured to be in linear communication with the elongate shaft via rotation of the rotating collar.

6. The shovel of claim 5, wherein the rotating collar is configured to secure the grip in a fixed rotational position.

7. The shovel of claim 3, comprising
   a coupling portion adapted to be attached to an elongate shaft.

8. The shovel of claim 7, wherein the rotating collar is configured to be in linear communication with the elongate shaft via rotation of the rotating collar.

9. The shovel of claim 8, wherein the rotating collar is configured to secure the handle in a fixed rotational position.

10. The shovel of claim 7, wherein the rotating collar and coupling portion are in rotational communication via threads.

11. The shovel of claim 3, wherein the D-plus grip further comprises one or more projections constructed and arranged to selectively mate with shaft openings to secure the D-plus grip in various rotated positions.

* * * * *